United States Patent
Sakurai

(10) Patent No.: US 10,481,546 B2
(45) Date of Patent: Nov. 19, 2019

(54) POWER SUPPLY APPARATUS AND IMAGE FORMING APPARATUS

(71) Applicant: CANON KABUSHIKI KAISHA, Tokyo (JP)

(72) Inventor: Toshio Sakurai, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/205,646

(22) Filed: Nov. 30, 2018

(65) Prior Publication Data

US 2019/0179251 A1 Jun. 13, 2019

(30) Foreign Application Priority Data

Dec. 8, 2017 (JP) .................................. 2017-236229

(51) Int. Cl.
*G03G 15/00* (2006.01)
*H02M 5/04* (2006.01)

(52) U.S. Cl.
CPC .............. *G03G 15/80* (2013.01); *H02M 5/04* (2013.01)

(58) Field of Classification Search
CPC .... G03G 15/00; G03G 15/80; G03G 15/2039; G03G 15/205; G03G 15/5004; G03G 15/5037; G03G 21/398; H02M 5/04
USPC ................... 399/38, 67–39, 75, 88
See application file for complete search history.

(56) References Cited

U.S. PATENT DOCUMENTS

| 8,744,289 B2 * | 6/2014 | Shimura | G03G 15/2039 399/33 |
| 8,983,314 B2 * | 3/2015 | Atarashi | G03G 15/205 399/37 |
| 9,037,010 B2 * | 5/2015 | Naganawa | G03G 15/2039 399/37 |
| 9,372,463 B2 * | 6/2016 | Shimura | G03G 15/2039 |

FOREIGN PATENT DOCUMENTS

| JP | 7-244535 A | 9/1995 |
| JP | 2003-122230 A | 4/2003 |
| JP | 2014-176198 A | 9/2014 |
| JP | 2017-083786 A | 5/2017 |

* cited by examiner

*Primary Examiner* — Hoan H Tran
(74) *Attorney, Agent, or Firm* — Canon U.S.A. Inc., IP Division

(57) ABSTRACT

A power supply apparatus includes a first circuit, a second circuit, a switcher configured to switch between a power supplied state and a power interrupted state, a driver configured to output a signal for switching the state of the switcher, an adjusting unit, a first control unit, a second control unit, a first communication portion, and a second communication portion. The first control unit is operated by power supplied by a signal generated in the first communication portion. The first control unit transmits, to the second communication portion, information about a detection result. The second control unit controls the adjusting unit based on the information. The first control unit outputs a predetermined signal for causing the driver to output the switching signal for putting the switcher into the interrupted state in a case where abnormality occurs. The driver outputs the switching signal for putting the switcher into the interrupted state based on the predetermined signal.

15 Claims, 10 Drawing Sheets

POWER SUPPLY APPARATUS AND IMAGE FORMING APPARATUS

BACKGROUND OF THE INVENTION

Field of the Invention

The present disclosure generally relates to a power supply apparatus which controls power to be supplied to a load and to an image forming apparatus with such a power supply apparatus.

Description of the Related Art

In a power supply apparatus that supplies power output from a commercial power supply to a load, a configuration has been known that interrupts the power to be supplied from the commercial power supply to the load in a case where abnormality occurs inside the power supply apparatus. The abnormality inside the power supply apparatus means, for example, failure of a current detector that detects a current to be supplied to the load.

Japanese Patent Application Laid-Open No. 7-244535 discusses a configuration in which a power supply control unit controls the power supply apparatus to interrupt the power to be supplied to the load in a case where a detection result by a temperature sensor is larger than prescribed temperature.

In Japanese Patent Application Laid-Open No. 7-244535, for example, if the power supply control unit fails to operate properly, the power to be supplied to the load is not appropriately controlled. In addition, the power supply apparatus may perform abnormal operation due to inappropriate power control. In this case, since the power supply control unit fails to operate properly, the power to be supplied to the load is not interrupted, and excess power may be supplied to the load, which increases power consumption.

SUMMARY OF THE INVENTION

The present disclosure is generally directed to an apparatus capable of controlling power so as to suppress an unwanted increase of power consumption.

According to an aspect of the present disclosure, a power supply apparatus includes a first circuit connected to a predetermined power supply, and a second circuit insulated from the first circuit. The power supply apparatus includes a switcher provided in the first circuit and configured to switch between a supplied state in which power is supplied from the predetermined power supply to a load, and an interrupted state in which the power is not supplied from the predetermined power supply to the load, a driver provided in the second circuit and configured to output a switching signal to switch a state of the switcher, an adjusting unit provided in the first circuit and configured to adjust the power supplied from the predetermined power supply to the load, a second control unit provided in the second circuit and configured to control the adjusting unit, a first control unit provided in the first circuit and configured to detect a parameter relating to the power supplied to the load, a first communication portion provided in the first circuit and connected to the first control unit, and a second communication portion provided in the second circuit, insulated from the first communication unit, and configured to perform wireless communication with the first communication portion. The first control unit is operated by power that is supplied by a signal generated in the first communication portion due to a signal output from the second control unit to the second communication portion. The first control unit transmits, to the second communication portion, information relating to a detection result. The second control unit controls the adjusting unit based on the information transmitted to the second communication portion. The first control unit outputs, to the driver, a predetermined signal to cause the driver to output the switching signal for putting the switcher into the interrupted state in a case where abnormality occurs in the second circuit. The driver outputs the switching signal for putting the switcher into the interrupted state when the predetermined signal is output from the first control unit.

Further features of the present disclosure will become apparent from the following description of exemplary embodiments with reference to the attached drawings.

DESCRIPTION OF THE EMBODIMENTS

Some exemplary embodiments of the present disclosure are described below with reference to drawings. Shapes, relative arrangement, etc. of components described in the exemplary embodiments are appropriately changed depending on a configuration of an apparatus to which the present disclosure is applied, and various kinds of conditions, and do not limit the scope of the present disclosure to the following exemplary embodiments.

[Image Forming Apparatus]

Figure 1:
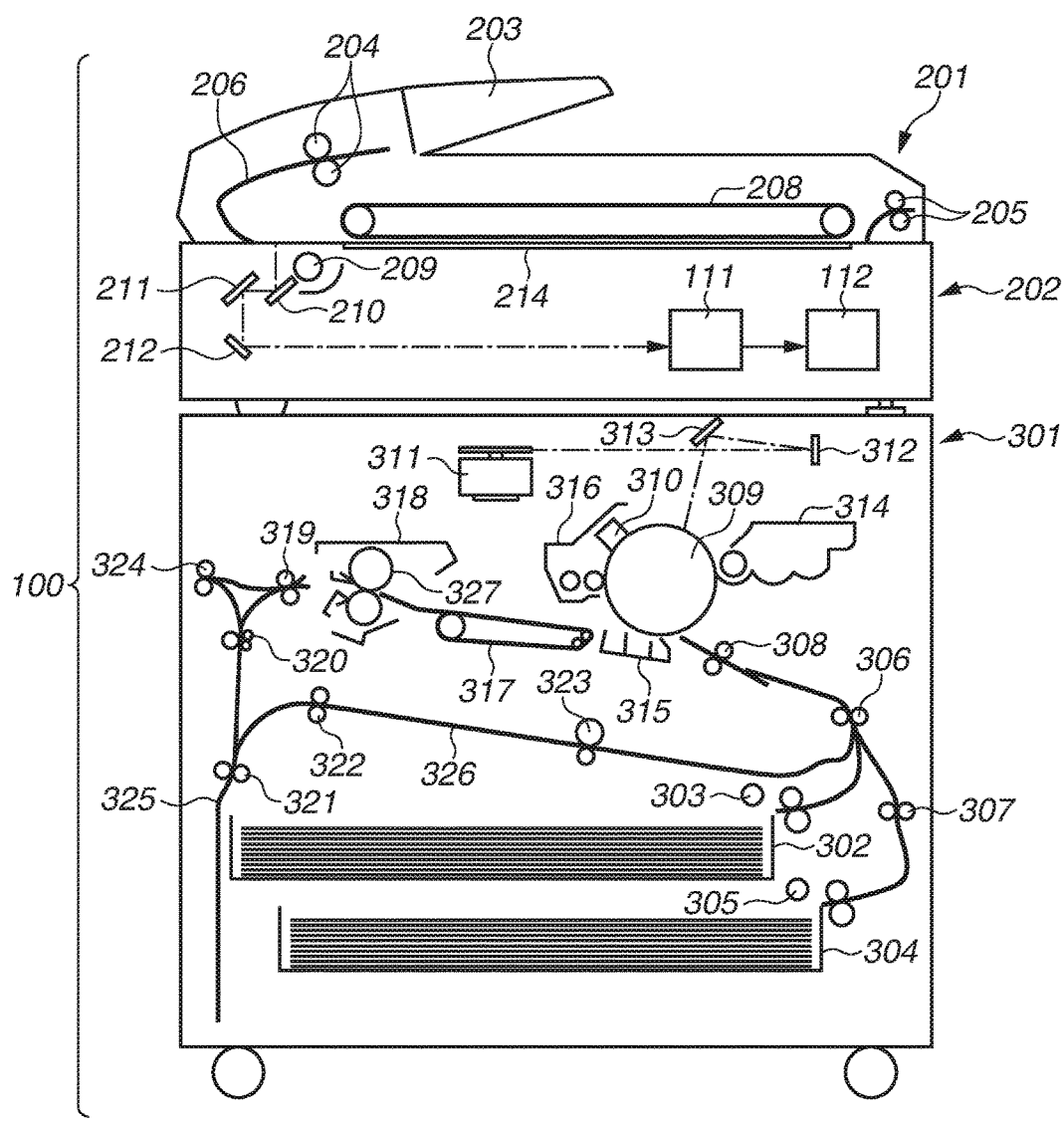
FIG. 1 is a cross-sectional view to illustrate an image forming apparatus according to a first exemplary embodiment.

A first exemplary embodiment is described below. FIG. 1 is a cross-sectional view illustrating a configuration of a monochrome electrophotographic copying apparatus (hereinafter, referred to as image forming apparatus) including a sheet conveyance apparatus used in the present exemplary embodiment. The image forming apparatus is not limited to the copying apparatus, and may be, for example, a facsimile apparatus, a printing machine, and a printer. Further, a recording system is not limited to the electrophotographic system, and may be, for example, an inkjet system. Moreover, the image forming apparatus may be of a monochrome type or a color type.

In the following, the configuration and a function of the image forming apparatus 100 are described with reference to FIG. 1. As illustrated in FIG. 1, the image forming apparatus 100 includes a document feeding apparatus 201, a reading apparatus 202, and an image printing apparatus 301.

A document stacked on a document stacking portion 203 of the document feeding apparatus 201 is fed by a feeding roller 204 one by one, and is conveyed to a glass document table 214 of the reading apparatus 202 along a conveyance guide 206. Further, the document is conveyed by a conveyance belt 208 at a constant speed, and is discharged to an unillustrated discharge tray by a discharging roller 205. Light reflected from an image of the document that is illuminated by an illumination system 209 at a reading position of the reading apparatus 202 is guided to an image reading unit 111 by an optical system including reflection mirrors 210, 211, and 212, and is converted into an image signal by the image reading unit 111. The image reading unit 111 includes a lens, a charge-coupled device (CCD) as a photoelectric conversion device, and a drive circuit for the CCD. The image signal output from the image reading unit 111 is subjected to various kinds of correction processing of an image processing unit 112 that includes a hardware device such as an application specific integrated circuit (ASIC), and the resultant signal is provided to the image printing apparatus 301. The document is read in the above-descried manner. In other words, the document feeding apparatus 201 and the reading apparatus 202 function as a document reading apparatus.

Further, document reading modes include a first reading mode and a second reading mode. The first reading mode is a mode of reading an image of the document conveyed at a constant speed, by the illumination system 209 and the optical system that are fixed at respective predetermined positions. The second reading mode is a mode for reading an image of the document placed on the glass document table 214 of the reading apparatus 202, by the illumination system 209 and the optical system that move at a constant speed. Normally, the image of the sheet document is read by the first reading mode, and the image of a bound document such as a book and a booklet is read by the second reading mode.

Sheet storage trays 302 and 304 are provided inside the image printing apparatus 301. Different types of recording media are stored in the sheet storage trays 302 and 304. For example, a plain paper of A4 size is stored in the sheet storage tray 302, and a thick paper of A4 size is stored in the sheet storage tray 304. The recording media are media on which the image is formed by the image forming apparatus. For example, the recording media include a sheet, a resin sheet, a fabric, an overhead projector (OHP) sheet, and a label.

The recording medium stored in the sheet storage tray 302 is fed by a feeding roller 303, and is sent to a registration roller 308 by a conveyance roller 306. The recording medium stored in the sheet storage tray 304 is fed by a feeding roller 305, and is sent to the registration roller 308 by conveyance rollers 307 and 306.

The image signal output from the reading apparatus 202 is provided to an optical scanning apparatus 311 that includes a semiconductor laser and a polygon mirror.

A photosensitive drum 309 is charged on its outer peripheral surface by a charger 310. After the outer peripheral surface of the photosensitive drum 309 is charged, a laser beam corresponding to the image signal provided from the reading apparatus 202 to the optical scanning apparatus 311 is applied to the outer peripheral surface of the photosensitive drum 309 from the optical scanning apparatus 311 through the polygon mirror and mirrors 312 and 313. As a result, an electrostatic latent image is formed on the outer peripheral surface of the photosensitive drum 309. A charging method using, for example, a corona charger or a charging roller is used to charge the photosensitive drum 309.

Subsequently, the electrostatic latent image is developed by toner in a developer unit 314, and a toner image is formed on the outer peripheral surface of the photosensitive drum 309. The toner image formed on the photosensitive drum 309 is transferred to the recording medium by a transfer charger 315 provided at a position (transfer position) facing the photosensitive drum 309. The registration roller 308 sends the recording medium to the transfer position at timing of transfer.

The recording medium on which the toner image has been transferred as described above is sent to a fixing unit 318 by a conveyance belt 317, and is heated and pressed by the fixing unit 318. As a result, the toner image is fixed on the recording medium. The image is formed on the recording medium by the image forming apparatus 100 in such a manner.

In a case where image formation is performed by a one-side printing mode, the recording medium passed through the fixing unit 318 is discharged to an unillustrated discharge tray by discharging rollers 319 and 324. In a case where an image is formed in a double-sided printing mode, fixing processing is performed on a first surface of the recording medium by the fixing unit 318, and the recording medium is then conveyed to a reverse path 325 by the discharging roller 319, a conveyance roller 320, and a reverse roller 321. After that, the recording medium is again conveyed to the registration roller 308 by conveyance rollers 322 and 323, and the image is formed on a second surface of the recording medium by the above-described method. After that, the recording medium is discharged to the unillustrated discharge tray by the discharging rollers 319 and 324.

In a case where the recording medium on which the image has been formed on the first surface is face-down discharged to the outside of the image forming apparatus 100, the recording medium passed through the fixing unit 318 is conveyed in a direction toward the conveyance roller 320 through the discharging roller 319. After that, rotation of the conveyance roller 320 is reversed immediately before a trailing edge of the recording medium passes through a nip part of the conveyance roller 320, and the recording medium is discharged to the outside of the image forming apparatus 100 through the discharging roller 324 while the first surface of the recording medium is facing downward.

The above is a description of the configuration and the function of the image forming apparatus 100.

Figure 2:
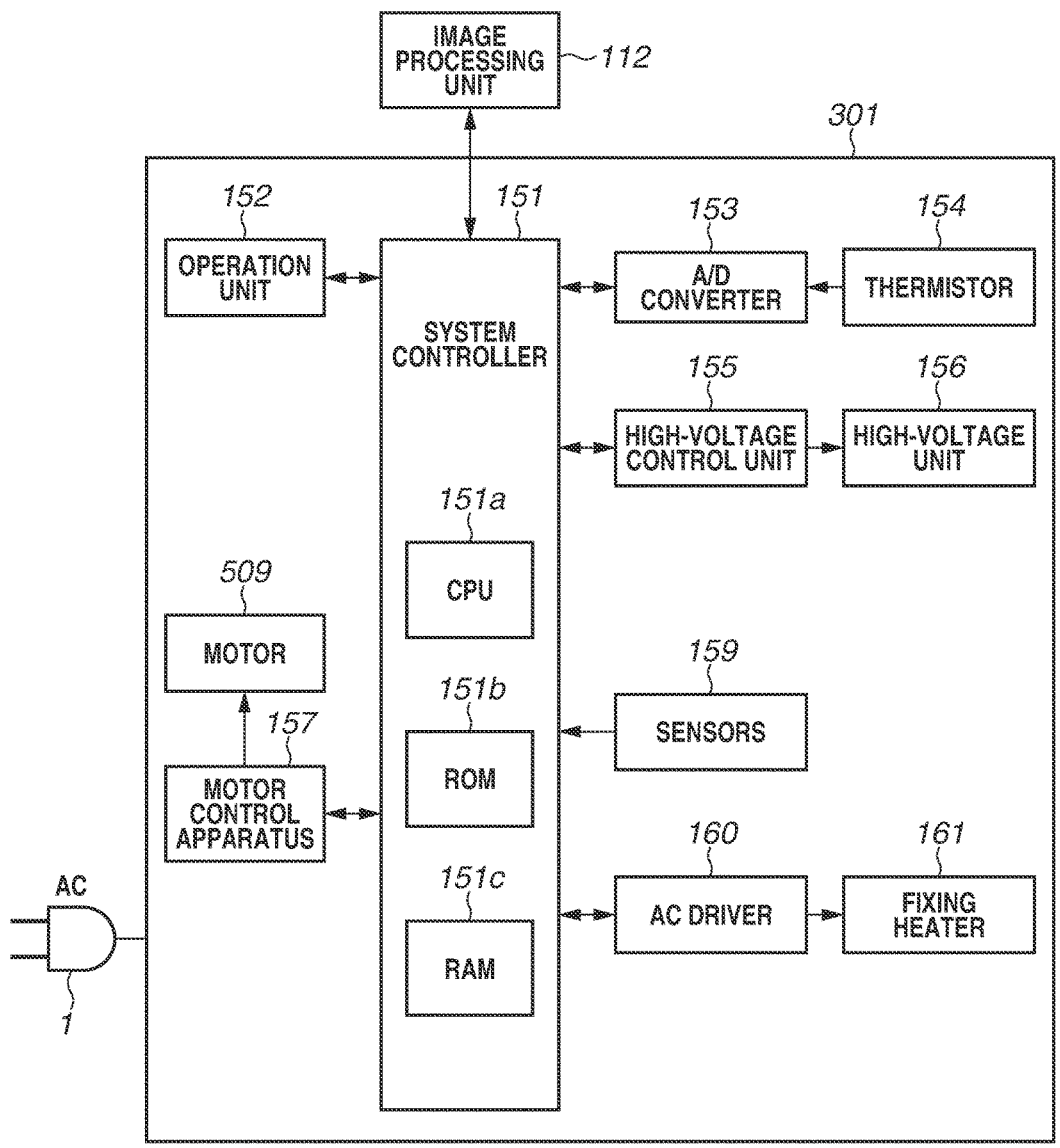
FIG. 2 is a block diagram illustrating a configuration for controlling the image forming apparatus according to the first exemplary embodiment.

FIG. 2 is a block diagram illustrating an example of a control configuration of the image forming apparatus 100. As illustrated in FIG. 2, the image forming apparatus 100 is connected to an alternating-current (AC) power supply 1 which is a commercial power supply, and various kinds of apparatuses inside the image forming apparatus 100 are operated by power supplied from the AC power supply 1. As illustrated in FIG. 2, a system controller 151 includes a central processing unit (CPU) 151a, a read-only memory (ROM) 151b, and a random access memory (RAM) 151c. Further, the system controller 151 is connected to the image processing unit 112, an operation unit 152, an analog-todigital (A/D) converter 153, a high-voltage control unit 155, a motor control apparatus 157, sensors 159, and an AC driver 160. The system controller 151 can transmit and receive data and commands to/from the connected units.

The CPU 151a reads and executes various kinds of programs stored in the ROM 151b to execute various kinds of sequences relating to a predetermined image formation sequence.

The RAM 151c is a storage device. Various kinds of data such as a setting value for the high-voltage control unit 155, an instruction value for the motor control apparatus 157, and information provided from the operation unit 152 are stored in the RAM 151c.

The system controller 151 transmits, to the image processing unit 112, setting value data for various kinds of apparatuses provided inside the image forming apparatus 100. The setting value data is necessary for image processing performed by the image processing unit 112. Further, the system controller 151 receives signals from the sensors 159, and sets the setting value of the high-voltage control unit 155 based on the received signals.

The high-voltage control unit 155 supplies a necessary voltage to a high-voltage unit 156 (e.g., charger 310, developer unit 314, and transfer charger 315) according to the setting value set by the system controller 151.

The motor control apparatus 157 controls a motor that drives a load provided inside the image forming apparatus 100 according to an instruction provided from the CPU 151a. In FIG. 2, only a motor 509 is illustrated as the motor of the image forming apparatus 100; however, a plurality of motors is actually provided in the image forming apparatus 100. Further, one motor control apparatus may control the plurality of motors. Moreover, although only one motor control apparatus is provided in FIG. 2, two or more motor control apparatuses may be provided in the image forming apparatus 100.

The A/D converter 153 receives a signal detected by a thermistor 154 that detects temperature of the fixing heater 161, converts the detection signal from an analog signal to a digital signal, and transmits the digital signal to the system controller 151. The system controller 151 controls the AC driver 160 based on the digital signal received from the A/D converter 153. The AC driver 160 controls the fixing heater 161 such that the temperature of the fixing heater 161 becomes temperature necessary for the fixing processing. The fixing heater 161 is a heater used in the fixing processing and is included in the fixing unit 318.

The system controller 151 controls the operation unit 152 to display, on a display unit provided in the operation unit 152, an operation screen allowing for a user to set a type of a recording medium to be used, etc. The system controller 151 receives information set by the user from the operation unit 152, and controls the operation sequence of the image forming apparatus 100 based on the information set by the user. Further, the system controller 151 transmits information indicating a state of the image forming apparatus 100 to the operation unit 152. The information indicating the state of the image forming apparatus 100 is information relating to, for example, the number of image formed sheets, a progress state of the image forming operation, jam or double feeding of sheets in the document reading apparatus 202 and the image printing apparatus 301. The operation unit 152 displays, on the display unit, the information received from the system controller 151.

The system controller 151 controls the operation sequence of the image forming apparatus 100 in the above-described manner.

[AC Driver]

Figure 3:
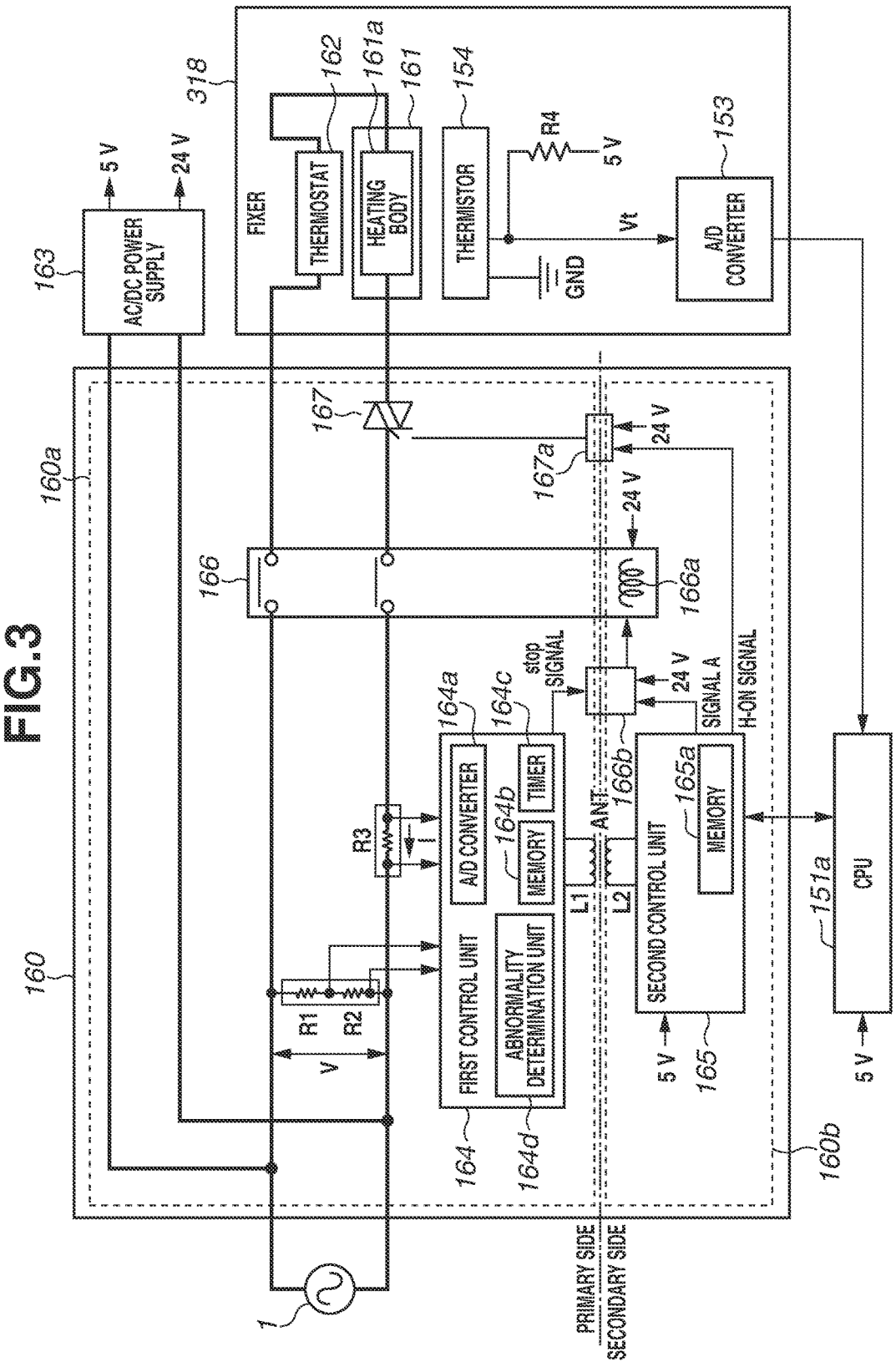
FIG. 3 is a control block diagram illustrating a configuration including an alternating-current (AC) driver according to the first exemplary embodiment.

FIG. 3 is a control block diagram illustrating a configuration of the AC driver 160. The AC driver 160 includes a first circuit 160a connected to the AC power supply 1, and a second circuit 160b insulated from the first circuit 160a. As illustrated in FIG. 3, the first circuit 160a is disposed in primary side of the AC driver 160, and the second circuit 160b is disposed in secondary side of the AC driver 160.

The AC driver 160 includes a first control unit 164 that detects a voltage V supplied from the AC power supply 1 and a current I flowing through the fixing heater 161, a relay circuit 166 that controls power supply from the AC power supply 1 to the fixing unit 318, a triac 167, and a second control unit 165 that controls the relay circuit 166 and the triac 167. As described below, in the present exemplary embodiment, the relay circuit 166 is controlled also by the first control unit 164.

As illustrated in FIG. 3, the first control unit 164 is insulated from the second control unit 165. The first control unit 164 is provided in the first circuit 160a, and the second control unit 165 is provided in the second circuit 160b. The first control unit 164 is electromagnetically coupled to the second control unit 165 by an antenna ANT. Further, the second control unit 165 is connected to the CPU 151a and is controlled by the CPU 151a. The antenna ANT is described below.

As illustrated in FIG. 3, the voltage output from the AC power supply 1 is also provided to an AC/DC power supply 163. The AC/DC power supply 163 converts the AC voltage output from the AC power supply 1 into, for example, DC voltages of 5 V and 24 V, and outputs the DC voltages. The DC voltage of 5 V is supplied to the CPU 151a and the second control unit 165. The DC voltage of 24 V is supplied to the relay circuit 166, a drive circuit 166b that drives the relay circuit 166, and a triac drive circuit 167a. The DC voltages of 5 V and 24 V are also supplied to various kinds of apparatuses inside the image forming apparatus 100. A voltage output from the AC/DC power supply 163 is not supplied to the first control unit 164. The first control unit 164 is supplied with power from the second control unit 165 via the antenna ANT. A specific configuration is described below.

Figure 4:
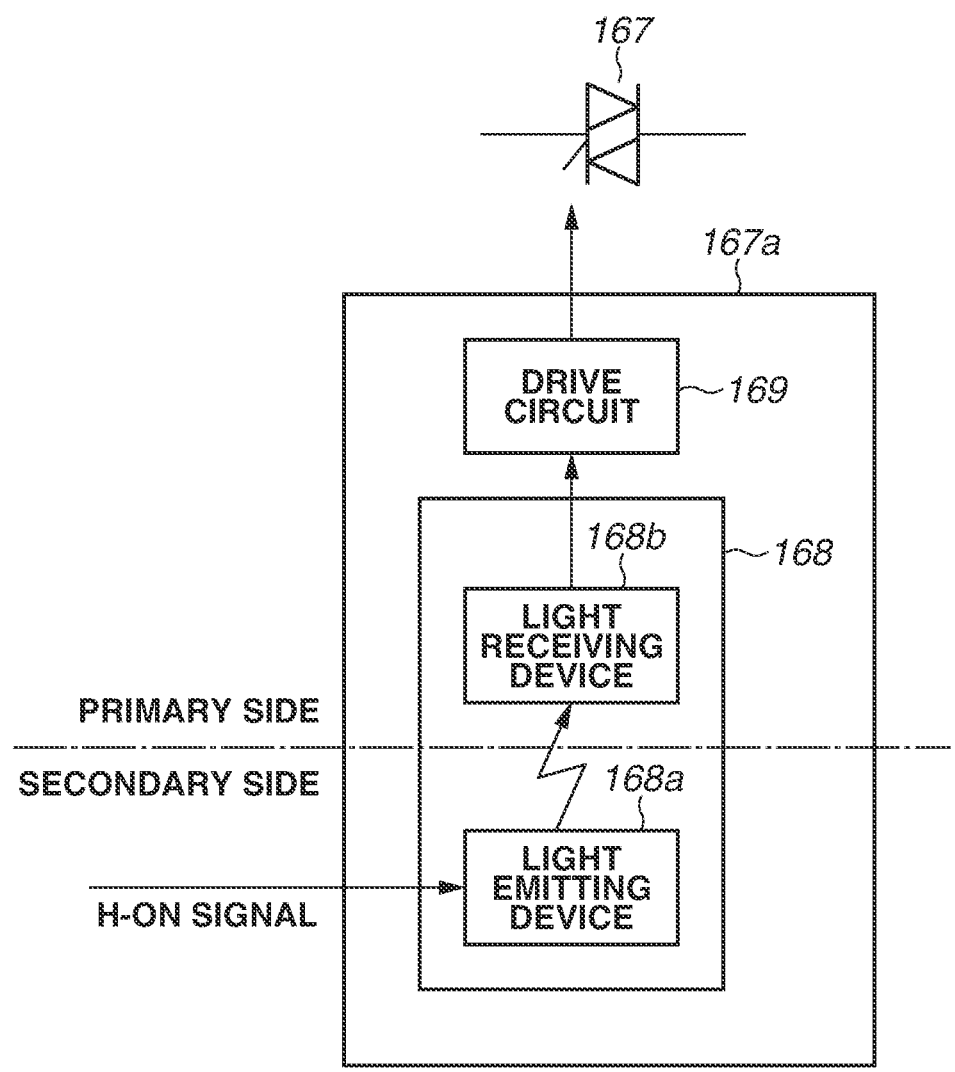
FIG. 4 is a block diagram illustrating a configuration of a triac drive circuit.

The triac drive circuit 167a is a circuit controlling the triac 167. FIG. 4 is a block diagram for illustrating a configuration of the triac drive circuit 167a. As illustrated in FIG. 4, the triac drive circuit 167a includes a photocoupler 168 and a drive circuit 169. The photocoupler 168 includes a light emitting device 168a provided in the second circuit 160b and a light receiving device 168b provided in the first circuit 160a. The drive circuit 169 drives the triac 167 according to light received by the light receiving device 168b.

When an H-ON signal='H' is output from the second control unit 165, the light emitting device 168a provided in the triac drive circuit 167a is lit. Further, the drive circuit 169 drives and turns on the triac 167 when light output from the light emitting device 168a is received by the light receiving device 168b provided in the triac drive circuit 167a. As described above, the triac 167 of the first circuit 160a is controlled by the second circuit 160b while insulation between the first circuit 160a and the second circuit 160b is maintained.

When the triac 167 is controlled in the above-described manner, the power is supplied to the fixing heater 161. An amount of power supplied to the fixing heater 161 is adjusted through control of timing at which the triac 167 is turned on. A specific method of controlling the relay circuit 166 is described below.

<Antenna ANT>

{Power Supply from Second Control Unit to First Control Unit}

The first control unit 164 provided in the first circuit 160a is insulated from the second control unit 165 provided in the second circuit 160b, and is electromagnetically coupled to the second control unit 165 by the antenna ANT that includes a coil (winding) L1 serving as a first communication portion and a coil (winding) L2 serving as a second communication portion. An amplitude-modulated high-frequency (e.g., 13.56 MHz) signal is provided to the coil L2. The AC current corresponding to the signal flows through the coil L2, and the AC voltage is generated in the coil L1 by an AC magnetic field that is generated on the coil L2 due to the flow of the AC current. The first control unit 164 is powered by the AC voltage generated in the coil L1. As described above, in the present exemplary embodiment, the power is supplied from the second control unit 165 to the first control unit 164 via the antenna ANT. As a result, it is unnecessary to provide, in the first circuit 160a, a power supply that operates the first control unit 164, which makes it possible to suppress upsizing of the apparatus and increase of the cost. The second control unit 165 supplies the power to the first control unit 164, for example, for a period that is shorter than a period in which the first control unit 164 detects the voltage V and the current I. Further, the second control unit 165 may not supply the power to the first control unit 164 during a period in which the image forming apparatus 100 is in a sleep state.

{Data Communication Between Second Control Unit and First Control Unit}

Figure 5:
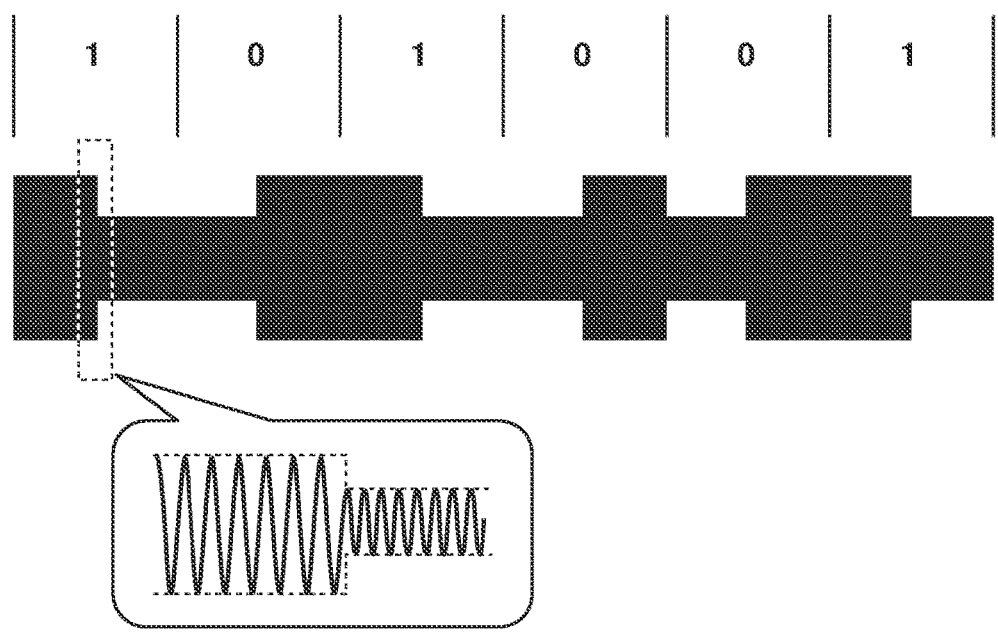
FIG. 5 is a diagram illustrating an amplitude-modulated wave.

FIG. 5 is a diagram illustrating the amplitude-modulated signal. As illustrated in FIG. 5, the signal indicative of '0' and '1' is expressed by a combination of a signal including a first amplitude and a signal including a second amplitude smaller than the first amplitude. For example, a first half of one bit of the signal indicative of '1' is expressed by the signal including the first amplitude, and a latter half of one bit thereof is expressed by the signal including the second amplitude. Further, a first half of one bit of the signal indicative of '0' is expressed by the signal including the second amplitude, and a latter half of one bit thereof is expressed by the signal including the first amplitude.

The amplitude-modulated signal as illustrated in FIG. 5 is provided to the coil L2. As a result, the signal corresponding to the signal provided to the coil L2 is generated in the coil L1.

The first control unit 164 changes, for example, a resistance value of a variable resistor provided in the first control unit 164, according to data transmitted to the second control unit 165. As a result, the signal generated in the coil L1 is changed due to change of impedance of the coil L1. The first control unit 164 superimposes data on the signal generated in the coil L1 in the above-described manner, thereby transmitting the data to the second control unit 165.

The second control unit 165 extracts the data from a signal that is generated in the coil L2 due to the superimposition of the data on the signal generated in the coil L1 by the first control unit 164. More specifically, the second control unit 165 detects change of the signal generated in the coil L2 due to the change of the impedance of the coil L1 made by the first control unit 164 when interposing the data on the signal generated in the coil L1, thereby reading the data from the first control unit 164.

In such a manner, the first control unit 164 transmits the data to the second control unit 165 that is electromagnetically coupled by the antenna ANT. In other words, the first control unit 164 transmits the data to the second control unit 165 through wireless communication between the coil L1 and the coil L2.

<Temperature Control of Fixing Heater>

A method of controlling the temperature of the fixing heater 161 is described below. The power output from the AC power supply 1 is supplied, through the AC driver 160, to a heating body 161a inside the fixing heater 161 provided in the fixing unit 318.

The first control unit 164 detects the voltage V (both-end voltage V of resistor R2) supplied from the AC power supply 1. Further, the first control unit 164 detects the current I flowing through the heating body 161a based on the both-end voltage of the resistor R2.

The first control unit 164 includes an A/D converter 164a that converts the provided voltage V and the received current I from analog values into digital values. The first control unit 164 samples the voltage V and the current I converted by the A/D converter 164a at a predetermined period T1 (e.g., 50 μs). The first control unit 164 performs integration of each of V^2, I^2, and V*I as the following expressions (1) to (3) every time the first control unit 164 samples the voltage V and the current I.

$$\Sigma V(n)^2 \quad (1)$$

$$\Sigma I(n)^2 \quad (2)$$

$$\tau V(n)I(n) \quad (3)$$

The first control unit 164 stores integrated values in a memory 164b.

Further, the first control unit 164 detects timing at which the voltage V is changed from a negative value to a positive value (hereinafter, referred to as zero-cross timing).

At the zero-cross timing, the first control unit 164 calculates an effective value Vrms of the voltage V, an effective value Irms of the current I, and an effective value Prms of the power V*I (=P) by the following expressions (4) to (6).

$$Vrms = \sqrt{\frac{1}{N}\sum_{n=1}^{N} V(n)^2} \quad (4)$$

$$Irms = \sqrt{\frac{1}{N}\sum_{n=1}^{N} I(n)^2} \quad (5)$$

$$Prms = \frac{1}{N}\sum_{n=1}^{N} V(n)I(n) \quad (6)$$

The first control unit 164 stores the calculated effective values Vrms, Irms, and Prms in the memory 164b. The first control unit 164 resets the integrated values of V^2, I^2, and V*I stored in the memory 164b every time the first control unit 164 calculates the effective values Vrms, Irms, and Prms. Further, the first control unit 164 updates the effective values Vrms, Irms, and Prms stored in the memory 164b with newly-calculated effective values Vrms, Irms, and Prms every time the first control unit 164 calculates the effective values Vrms, Irms, and Prms.

The CPU 151a controls the second control unit 165 to acquire the effective values Vrms, Irms, and Prms from the first control unit 164 at every predetermined period T2 (e.g., at every zero-cross period). As a result, the second control unit 165 transmits a signal requesting the effective values Vrms, Irms, and Prms (hereinafter, referred to as request signal) to the first control unit 164 via the antenna ANT. The request signal is a signal expressed by the combination of the signals indicative of '1' and '0' described with reference to FIG. 5, and is a preset signal.

When the first control unit 164 receives the request signal from the second control unit 165 via the antenna ANT, the first control unit 164 transmits data of the effective values Vrms, Irms, and Prms to the second control unit 165 by the above-described method. The CPU 151a acquires the effective values Vrms, Irms, and Prms at a predetermined period as described above.

The fixing unit 318 includes a thermostat 162. The thermostat 162 includes a function to prevent the power from being supplied to the heating body 161a when temperature of the thermostat 162 reaches predetermined temperature.

A thermistor 154 that detects the temperature of the fixing heater 161 is provided near the fixing heater 161. As illustrated in FIG. 3, the thermistor 154 is connected to ground (GND). For example, a characteristic of the thermistor 154 is that a resistance value becomes lower as the temperature becomes higher. When the temperature of the thermistor 154 is varied, a both-end voltage Vt of the thermistor 154 is also varied. The temperature of the fixing heater 161 is detected by detection of the voltage Vt.

The voltage Vt of an analog signal output from the thermistor 154 is provided to the A/D converter 153. The A/D converter 153 converts the voltage Vt from the analog signal into a digital signal, and provides the digital signal to the CPU 151a.

The CPU 151a controls the triac 167 with the second control unit 165, based on the effective values Vrms, Irms, and Prms acquired from the first control unit 164 and the voltage Vt output from the A/D converter 153, so that the temperature of the fixing heater 161 is controlled. The specific method of controlling the temperature of the fixing heater 161 is described below.

Figure 6:
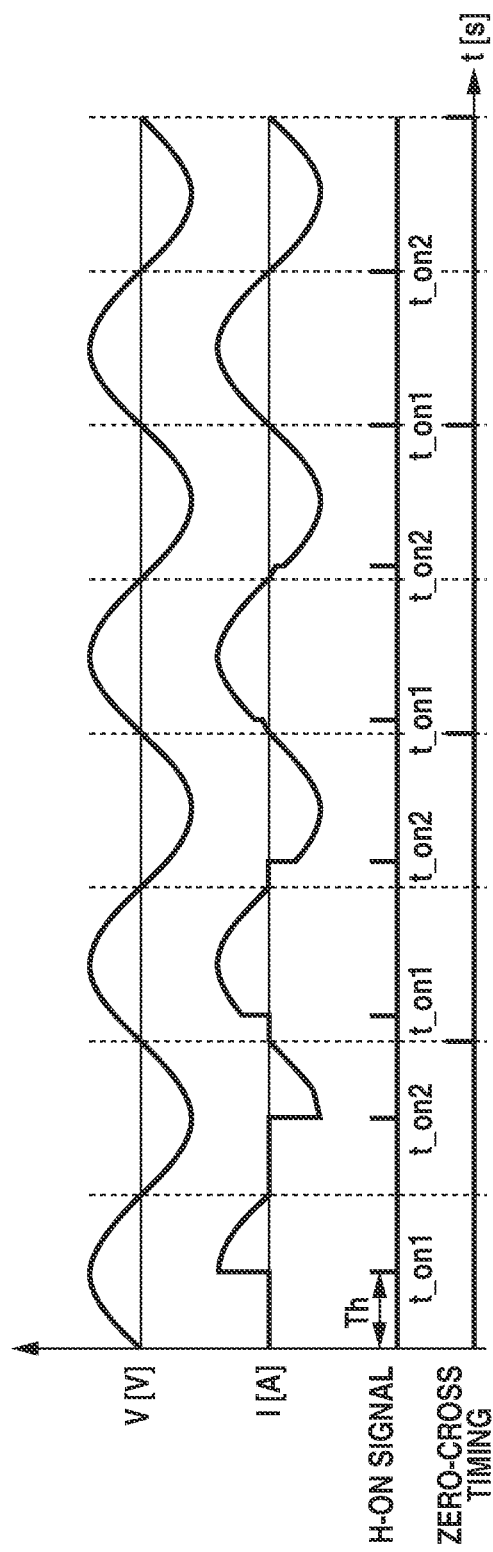
FIG. 6 is a time chart illustrating a voltage V of an AC power supply, a current I flowing through a heating body, an H-ON signal output from a control unit, and zero-cross timing.

FIG. 6 is a time chart indicating the voltage V of the AC power supply 1, the current I flowing through the heating body 161a, the H-ON signal output from the second control unit 165, and the zero-cross timing. As illustrated in FIG. 6, a period Tzx of the zero-cross timing corresponds to the period of the voltage of the AC power supply 1.

As illustrated in FIG. 6, when a time Th from the zero-cross timing to timing t_on1 at which H-ON signal='H' is output is controlled, an amount of the current flowing through the heating body 161a (amount of supplied power) is controlled. More specifically, for example, the amount of the current flowing through the heating body 161a is increased as the time Th becomes shorter. In other words, when the time Th is controlled to become shorter, the temperature of the fixing heater 161 is increased.

In the present exemplary embodiment, the CPU 151a controls, with the second control unit 165, the time from the zero-cross timing to the timing t_on1, to control the amount of the current flowing through the heating body 161a. This allows the CPU 151a to control the temperature of the fixing heater 161. In the present exemplary embodiment, the triac 167 is controlled such that the same amount of current having an opposite polarity relative to the current flowing caused by output of the H-ON signal='H' at the timing t_on1 flows through the heating body 161a. More specifically, as illustrated in FIG. 6, the H-ON signal='H' is output also at timing t_on2 after a time Tzx/2 elapses from the timing t_on1 (i.e., timing after half-period of voltage of AC power supply 1).

Figure 7:
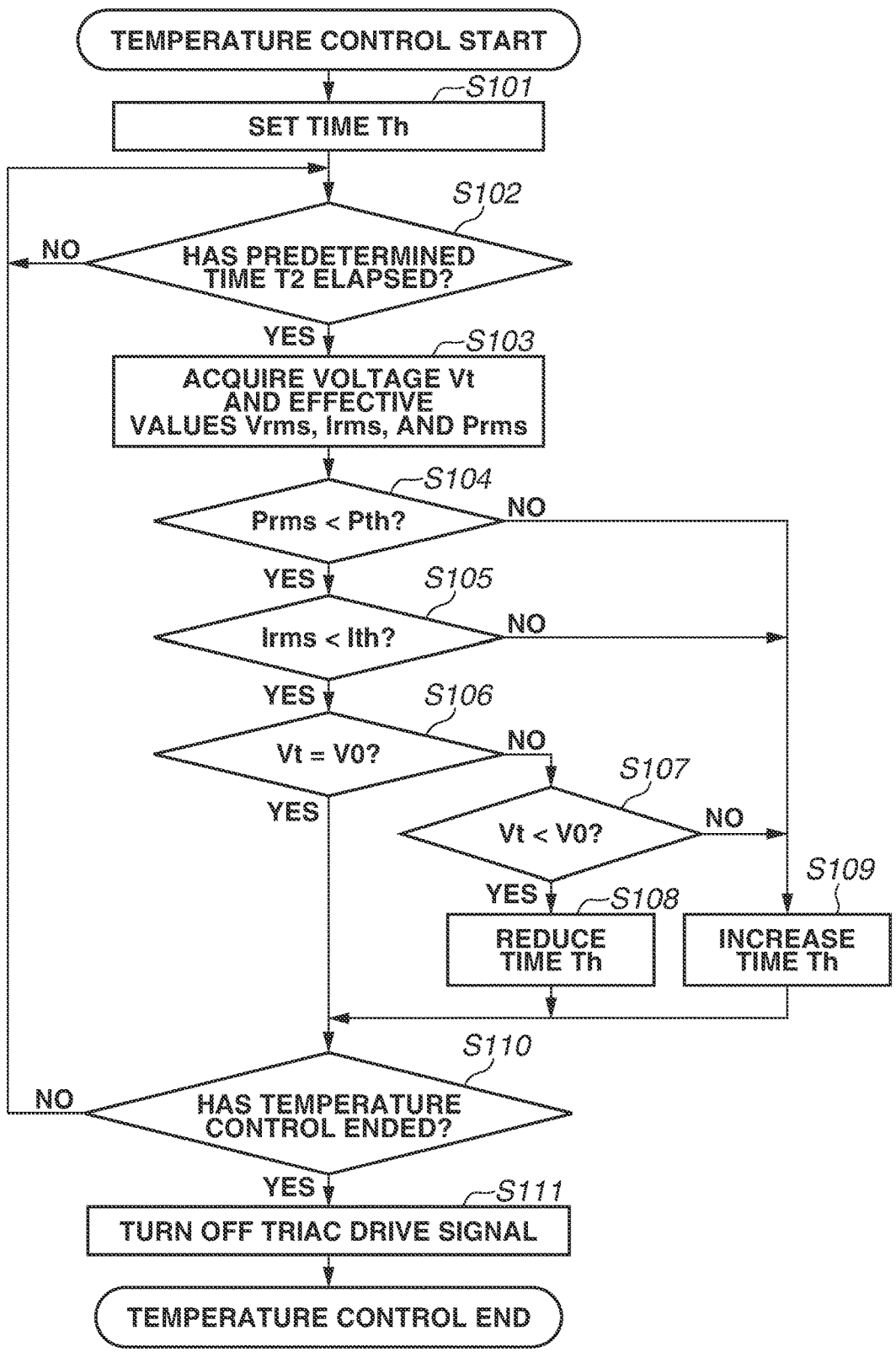
FIG. 7 is a flowchart illustrating a method of controlling the temperature of a fixing heater according to the first exemplary embodiment.

FIG. 7 is a flowchart illustrating the method of controlling the temperature of the fixing heater 161. The temperature control of the fixing heater 161 according to the present exemplary embodiment is described below with reference to FIG. 7. Processing in the flowchart is executed by the CPU 151a. The processing in the flowchart is executed, for example, when the image forming apparatus 100 is activated.

In step S101, the CPU 151a sets the time Th, for example, based on a difference between the voltage Vt acquired from the A/D converter 153 and a voltage V0 corresponding to target temperature of the fixing heater 161, and notifies the second control unit 165 of the time Th. As a result, the second control unit 165 outputs the H-ON signal to the triac drive circuit 167a based on the set time Th.

After that, after a predetermined time T2 elapses in step S102 after the time Th is set (Yes in step S102), the CPU 151a acquires the voltage Vt output from the A/D converter 153 in step S103. Further, the CPU 151a transmits the request signal to the first control unit 164 through the second control unit 165, to acquire the effective values Vrms, Irms, and Prms.

After that, in a case where the power effective value Prms is equal to or larger than a threshold Pth (Prms≥Pth) in step S104 (N in step S104), the CPU 151a outputs an instruction to increase the currently-set time Th, to the second control unit 165 in step S109. The increase amount of the time Th may be a predetermined amount or may be determined based on a difference between the effective value Prms and the threshold Pth.

As described above, in the case where the power effective value Prms is equal to or larger than the threshold Pth, the time Th is set to make the effective value Prms smaller than the threshold Pth, so that excess power can be prevented from being supplied to the fixing heater 161. As a result, it is possible to suppress increase of the power consumption. The threshold Pth is set to a value larger than the power that increases the temperature of the fixing heater 161 to the target temperature. After that, the processing proceeds to step S110.

In contrast, in a case where the power effective value Prms is smaller than the threshold Pth (Prms<Pth) in step S104 (Yes in step S104), the processing proceeds to step S105.

In a case where the current effective value Irms is equal to or larger than a threshold Ith (Irms≥Ith) in step S105 (No in step S105), the CPU 151a outputs the instruction to increase the currently-set time Th, to the second control unit 165 in step S109. The increase amount of the time Th may be a predetermined amount or may be determined based on a difference between the effective value Irms and the threshold Ith.

As described above, in the case where the current effective value Irms is equal to or larger than the threshold Ith, the time Th is set to make the effective value Irms smaller than the threshold Ith, so that excess current can be prevented from being supplied to the heating body 161a. As a result, it is possible to suppress excessive increase of the temperature of the fixing heater 161. The threshold Ith is set to a value larger than the current that increases the temperature of the fixing heater 161 to the target temperature. Then, the processing proceeds to step S110.

In contrast, in a case where the effective value Irms is smaller than the threshold Ith (Irms<Ith) in step S105 (Yes in step S105), the processing proceeds to step S106.

In step S106, in a case where the voltage Vt acquired from the A/D converter 153 is equal to the voltage V0 corresponding to the target temperature of the fixing heater 161 (Yes in step S106), the processing proceeds to step S110.

In step S106, in a case where the voltage Vt acquired from the A/D converter 153 is not equal to the voltage V0 corresponding to the target temperature of the fixing heater 161 (No in step S106), the processing proceeds to step S107.

In a case where the voltage Vt is larger than the voltage V0 in step S107 (N in step S107), the CPU 151a outputs, to the second control unit 165, the instruction to increase the currently-set time Th such that deviation between the voltage Vt and the voltage V0 becomes smaller, in step S109. The increase amount of the time Th may be a predetermined amount, or may be determined based on a difference value between the voltage V0 and the voltage Vt.

Further, in a case where the voltage Vt is smaller than the voltage V0 in step S107 (Y in step S107), the CPU 151a outputs, to the second control unit 165, an instruction to decrease the currently-set time Th such that the deviation between the voltage Vt and the voltage V0 becomes smaller, in step S108. The decrease amount of the time Th may be a predetermined amount, or may be determined based on the difference value between the voltage V0 and the voltage Vt.

In a case where the temperature control continues (i.e., printing job continues) in step S110 (No in step S110), the processing returns to step S102.

In contrast, in a case where the temperature control ends (i.e., printing job ends) in step S110 (Yes in step S110), the CPU 151a controls the second control unit 165 to stop driving of the triac 167 in step S111.

A variation of the power caused by increase of the time Th is different between a case where the voltage effective value is 100 V and a case where the voltage effective value is 80 V, for example. More specifically, the variation of the power caused by increase of the time Th in the case where the voltage effective value is 100 V is larger than the variation of the power caused by increase of the time Th in the case where the voltage effective value is 80 V. The CPU 151a controls the time Th based on the effective value Vrms of voltage.

The above is the method of controlling the temperature of the fixing heater 161.

<Method of Controlling Relay Circuit>

Next, a method of controlling the relay circuit 166 serving as a switcher according to the present exemplary embodiment is described. As illustrated in FIG. 3, the AC driver 160 includes the drive circuit 166b that controls the relay circuit 166. The drive circuit 166b controls a current as a switching signal supplied to a coil 166a that changes the state of the relay circuit 166, according to a signal A output from the second control unit 165, thereby controlling the relay circuit 166. Further, the drive circuit 166b controls the current supplied to the coil 166a, according to a stop signal output from the first control unit 164, thereby controlling the relay circuit 166.

Figure 8:
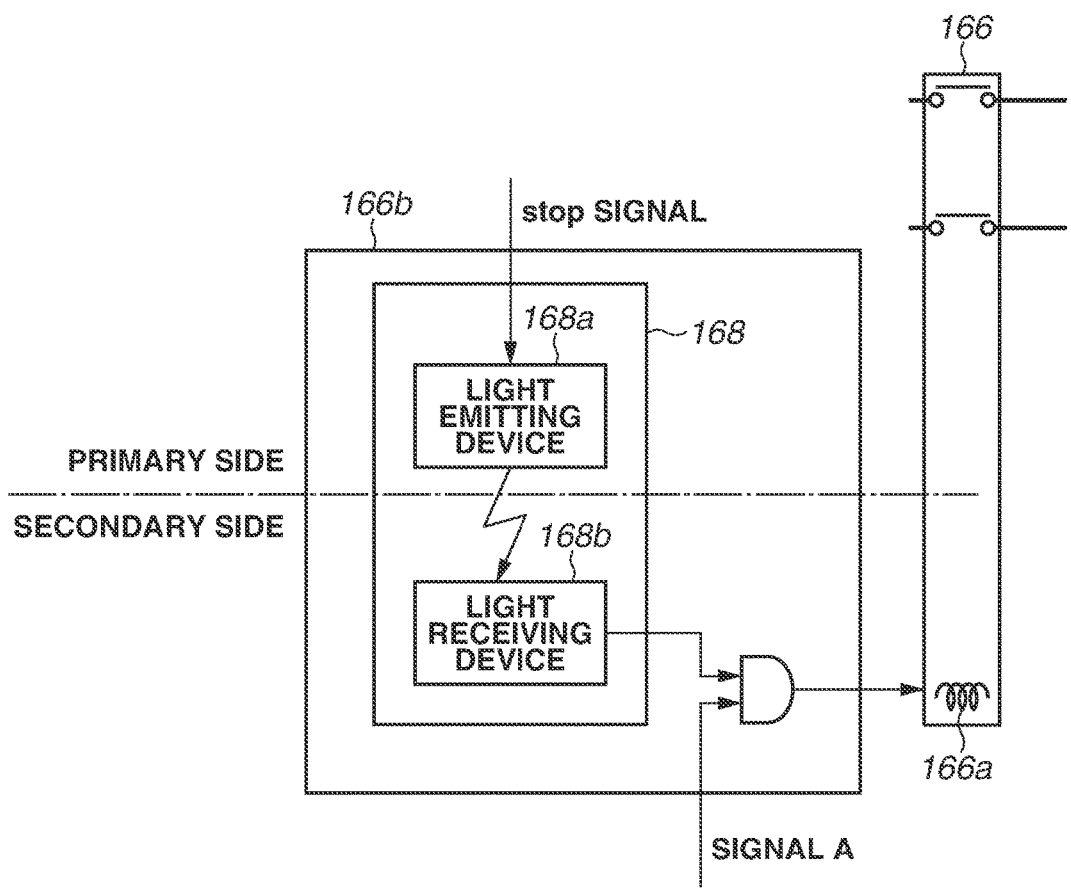
FIG. 8 is a block diagram illustrating a configuration of a drive circuit.

FIG. 8 is a block diagram for illustrating a configuration of the drive circuit 166b. As illustrated in FIG. 8, the drive circuit 166b has the photocoupler 168 that includes the light emitting device 168a provided in the first circuit 160a and the light receiving device 168b provided in the second circuit 160b. The method of controlling the relay circuit 166 is described below with reference to FIG. 8.

{Control of Relay Circuit 166 by Second Control Unit 165}

The configuration in which the drive circuit 166b controls the relay circuit 166 according to the signal A output from the second control unit 165 is described below.

To turn on the relay circuit 166, the second control unit 165 outputs the signal A='H' to the drive circuit 166b. When the signal A='H' is output from the second control unit 165, the drive circuit 166b supplies a current to the coil 166a. As a result, the relay circuit 166 is turned on, and the power is supplied from the AC power supply 1 to the fixing unit 318 (supplied state).

To turn off the relay circuit 166, the second control unit 165 outputs the signal A='L' to the drive circuit 166b. If the signal A='L' is output from the second control unit 165 when the relay circuit 166 is in an ON state, the drive circuit 166b stops the supply of the current to the coil 166a. As a result, the relay circuit 166 is turned off, and the power supply from the AC power supply 1 to the fixing unit 318 is interrupted (interrupted state).

{Control of Relay Circuit 166 by First Control Unit 164}

Next, a configuration is described in which the drive circuit 166b controls the relay circuit 166 according to the stop signal output from the first control unit 164. The first control unit 164 outputs the stop signal in an abnormal case described below.

When the stop signal is output from the first control unit 164, the light emitting device 168a provided in the drive circuit 166b is lit. The drive circuit 166b stops the supply of the current to the coil 166a when light output from the light emitting device 168a is received by the light receiving device 168b provided in the drive circuit 166b. When the supply of the current to the coil 166a is stopped, the relay circuit 166 is turned off, and the power supply from the AC power supply 1 to the fixing unit 318 is interrupted.

Thus, it is possible to control the supply of the current to the coil 166a of the second circuit 160b from the first circuit 160a side, while insulation between the first circuit 160a and the second circuit 160b is maintained. In other words, it is possible to control the relay circuit 166 from the first circuit 160a side while insulation between the first circuit 160a and the second circuit 160b is maintained.

{Control of Relay Circuit 166 in Abnormal Case}

In a case where abnormality occurs, for example, that detected temperature is decreased even though the heating body 161a is heated while fixing operation of the image on the sheet is not performed, the CPU 151a controls the second control unit 165 to output the signal A='L'. As a result, the relay circuit 166 is turned off, and the power supply from the AC power supply 1 to the fixing unit 318 is interrupted.

In a case where the CPU 151a fails to operate properly, however, the temperature adjustment of the fixing heater 161 may not be appropriately performed, and excess power may be supplied to the fixing unit 318. Accordingly, in the present exemplary embodiment, the following configuration is applied to suppress increase of the power consumption. If the CPU 151a fails to operate properly, the request signal is not transmitted to the first control unit 164. When a state where no request signal is received, continues for a predetermined time T3, an abnormality determination unit 164d provided in the first control unit 164 determines that abnormality has occurred in the CPU 151a. When the abnormality determination unit 164d determines that abnormality has occurred in the CPU 151a, the first control unit 164 outputs the stop signal to the drive circuit 166b. As a result, the relay circuit 166 is turned off, so that excess power can be prevented from being supplied to the fixing unit 318.

Figure 9:
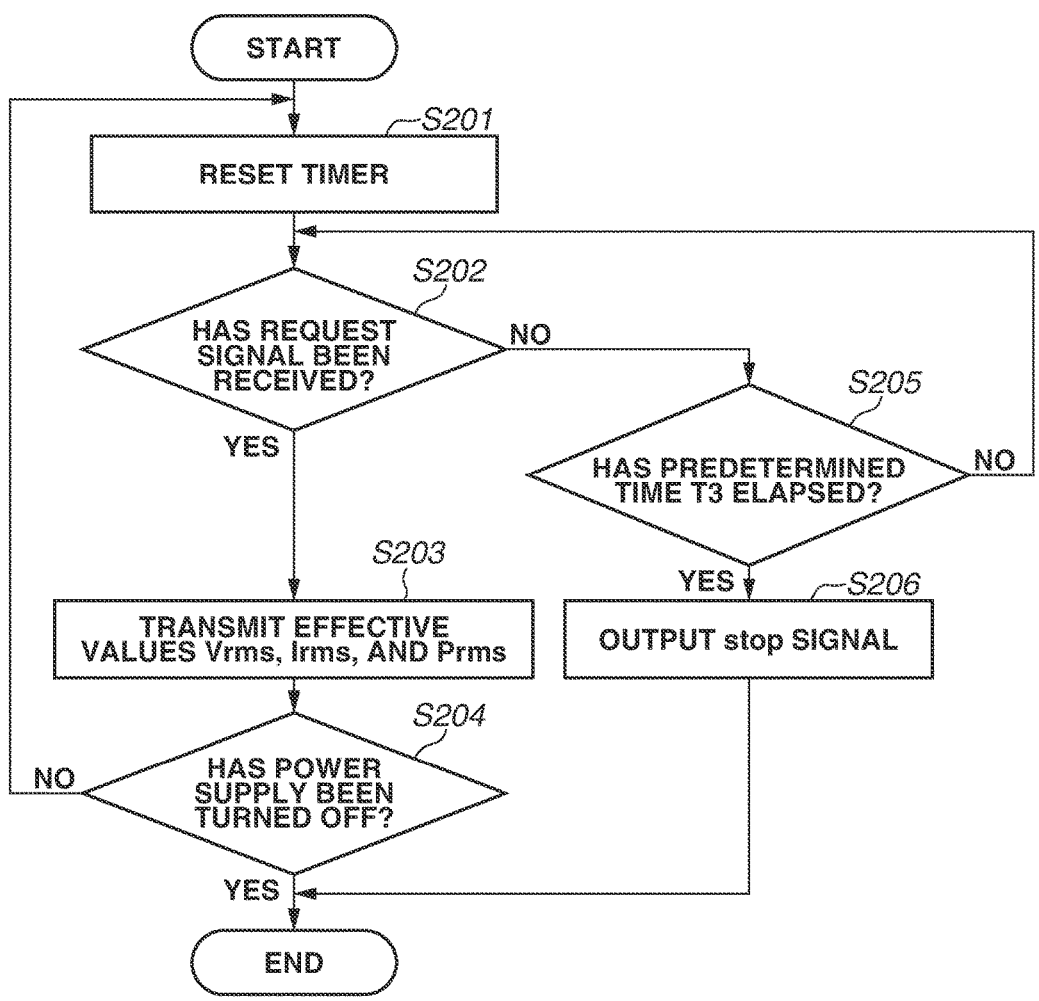
FIG. 9 is a flowchart for illustrating a method of controlling a relay circuit according to the first exemplary embodiment.

FIG. 9 is a flowchart for illustrating a method of controlling the relay circuit 166 by the first control unit 164. In the following, the method of controlling the relay circuit 166 by the first control unit 164 is described with reference to FIG. 9. Processing in the flowchart is executed by the first control unit 164. The processing in the flowchart is executed, for example, when the image forming apparatus 100 is activated.

In step S201, the first control unit 164 resets a timer 164c provided in the first control unit 164.

In a case where the first control unit 164 has received the request signal in step S202 (Yes in step S202), the first control unit 164 transmits the effective values Vrms, Irms, and Prms to the second control unit 165 via the antenna ANT in step S203.

Then, in a case where the image forming apparatus 100 is not turned off (No in step S204), the processing returns to step S201.

In contrast, in a case where the first control unit 164 has not received the request signal in step S202 (N in step S202), the processing proceeds to step S205.

When the state where no request signal is received, continues for the predetermined time T3 in step S205 (Yes in step S205), the first control unit 164 outputs the stop signal to the drive circuit 166b in step S206. As a result, the relay circuit 166 is turned off, and the power supply to the fixing unit 318 is interrupted.

As described above, in the present exemplary embodiment, when the state where no request signal is received, continues for the predetermined time T3, the first control unit 164 outputs the stop signal to the drive circuit 166b. As a result, even if the CPU 151a fails to operate properly, the relay circuit 166 is turned off, and the power supply to the fixing unit 318 is interrupted. Such a configuration is applied to the AC driver 160, which makes it possible to suppress increase of the power consumption. Further, interruption of the power supply to the fixing unit 318 improves safety of the image forming apparatus 100.

Further, in the present exemplary embodiment, the first control unit 164 provided in the first circuit 160a is insulated from the second control unit 165 provided in the second circuit 160b, and is electromagnetically coupled to the second control unit 165 by the antenna ANT that includes the coil L1 and the coil L2. More specifically, the AC voltage is generated in the coil L1 by the AC magnetic field that is generated on the coil L2 caused by the AC current flowing through the coil L2 according to the signal output from the second control unit 165. The first control unit 164 is operated by the AC voltage generated in the coil L1. Thus, in the present exemplary embodiment, the power is supplied from the second control unit 165 to the first control unit 164 via the antenna ANT. As a result, it is unnecessary to provide, in the first circuit 160a, a power supply that operates the first control unit 164, so that upsizing of the apparatus and increase of the cost can be prevented.

Further, in the present exemplary embodiment, the first control unit 164 changes, for example, the impedance of the coil L1 to change the signal generated in the coil L1, thereby transmitting data to the second control unit 165. The second control unit 165 detects the change and reads the data from the first control unit 164. Thus, the first control unit 164 transmits the data to the second control unit 165 that is electromagnetically coupled by the antenna ANT, in the above-described manner. As a result, it is unnecessary to provide a transformer between the first circuit 160a and the second circuit 160b, which makes it possible to suppress upsizing of the apparatus and increase of the cost while maintaining insulation between the first circuit 160a and the second circuit 160b.

A second exemplary embodiment is described below. Description of a configuration of the image forming apparatus 100 similar to that in the first exemplary embodiment is omitted.

In the first exemplary embodiment, when the state where no request signal is received, continues for the predetermined time T3, the first control unit 164 outputs the stop signal to the drive circuit 166b.

In the present exemplary embodiment, the first control unit 164 stores, in the memory 164b, the effective values Vrms, Irms, and Prms that have been transmitted to the second control unit 165. During a period until the predetermined time T2 elapses after the CPU 151a acquires the effective values Vrms, Irms, and Prms transmitted from the first control unit 164 to the second control unit 165, the CPU 151a transmits the acquired effective values Vrms, Irms, and Prms to the first control unit 164 via the antenna ANT. This process is performed in order to notify the first control unit 164 that the CPU 151a has received the effective values Vrms, Irms, and Prms.

In a case where the effective values Vrms, Irms, and Prms transmitted from the CPU 151a are respectively different from the effective values Vrms, Irms, and Prms stored in the memory 164b, the first control unit 164 outputs the stop signal to the drive circuit 166b. As a result, the relay circuit 166 is turned off, so that excess power can be prevented from being supplied to the fixing unit 318. The fact that the effective values Vrms, Irms, and Prms transmitted from the CPU 151a are respectively different from the effective values Vrms, Irms, and Prms stored in the memory 164b indicates occurrence of abnormality in the circuit on the secondary side (e.g., CPU 151a fails). Further, in a case where the effective values Vrms, Irms, and Prms transmitted from the CPU 151a are same as the effective values Vrms, Irms, and Prms stored in the memory 164b, the first control unit 164 determines that the circuit on the secondary side is normal.

Figure 10:
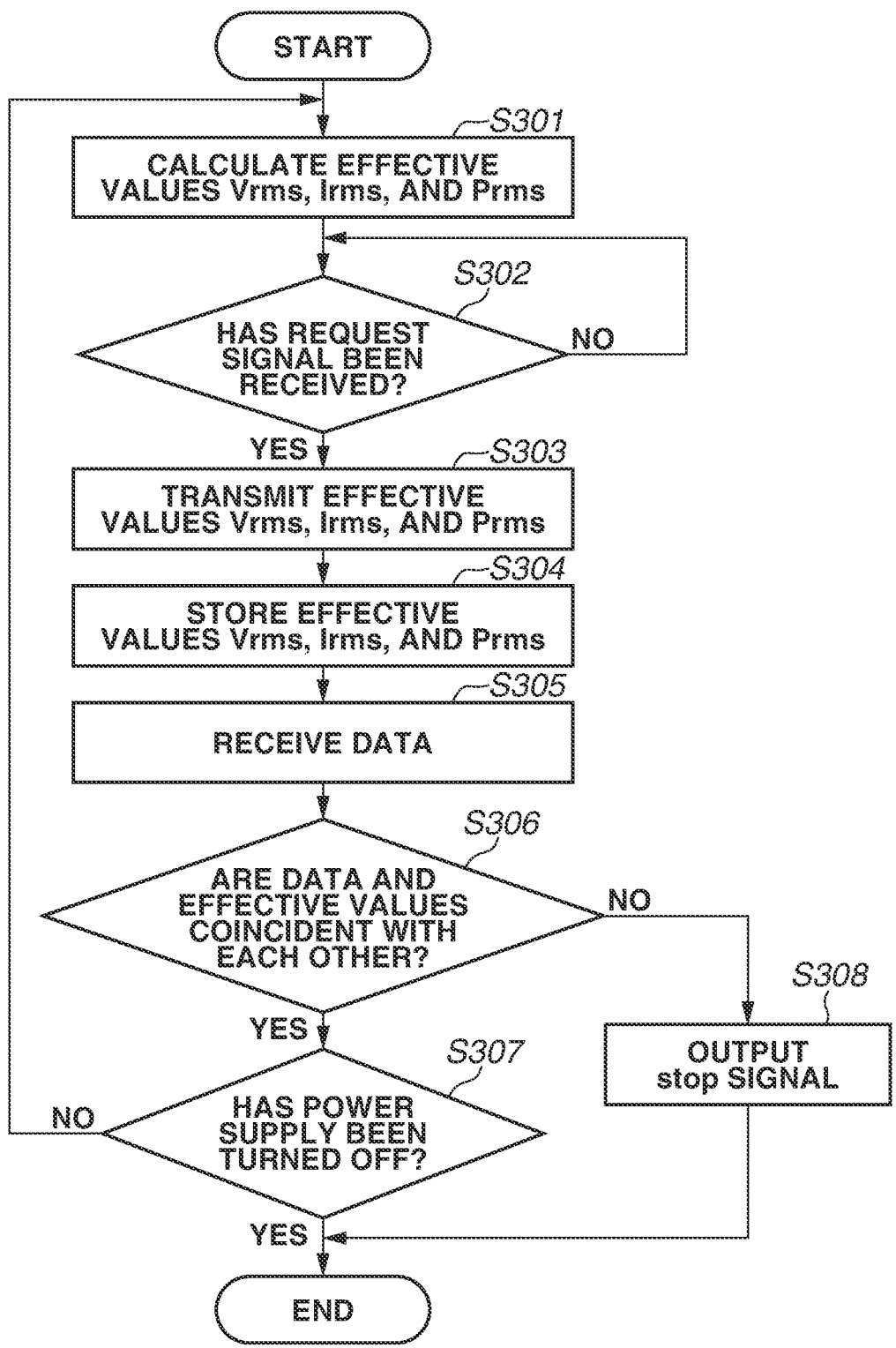
FIG. 10 is a flowchart for illustrating a method of controlling a relay circuit according to a second exemplary embodiment.

FIG. 10 is a flowchart for illustrating the method of controlling the relay circuit 166 by the first control unit 164. The method of controlling the relay circuit 166 by the first control unit 164 is described below with reference to FIG. 10. This processing in the flowchart is executed by the first control unit 164. The processing in the flowchart is executed, for example, when the image forming apparatus 100 is activated.

In step S301, the first control unit 164 calculates the effective values Vrms, Irms, and Prms.

When the first control unit 164 receives the request signal in step S302 (Yes in step S302), the first control unit 164 transmits the effective values Vrms, Irms, and Prms calculated in step S301 to the second control unit 165 via the antenna ANT in step S303.

After that, in step S304, the first control unit 164 stores the transmitted effective values Vrms, Irms, and Prms in the memory 164b.

In step S305, the first control unit 164 receives data of the effective values output from the CPU 151a, via the antenna ANT.

After that, in a case where the effective values of the data received in step S305 and the effective values stored in the memory 164b in step S304 are not coincident with each other in step S306 (No in step S306), the first control unit 164 outputs the stop signal to the drive circuit 166b in step S308. As a result, the relay circuit 166 is turned off, and the power supply to the fixing unit 318 is interrupted.

In contrast, in a case where the effective values of the data received in step S305 and the effective values stored in the memory 164b in step S304 are coincident with each other in step S306 (Yes in step S306), the processing proceeds to step S307.

In step S307, in a case where the image forming apparatus 100 is not turned off (No in step S307), the processing returns to step S301.

In step S307, in a case where the image forming apparatus 100 is turned off (Yes in step S307), the processing in the flowchart ends.

As described above, in the present exemplary embodiment, in the case where the effective values Vrms, Irms, and Prms transmitted from the CPU 151a are respectively different from the effective values Vrms, Irms, and Prms stored in the memory 164b, the first control unit 164 outputs the stop signal to the drive circuit 166b. As a result, even if the CPU 151a fails to operate properly, the relay circuit 166 is turned off, and the power supply to the fixing unit 318 is interrupted. If such a configuration is applied to the AC driver 160, increase of the power consumption can be suppressed. Further, interruption of the power supply to the fixing unit 318 improves safety of the image forming apparatus 100.

Furthermore, in the present exemplary embodiment, the first control unit 164 provided in the first circuit 160a is insulated from the second control unit 165 provided in the second circuit 160b, and is electromagnetically coupled to the second control unit 165 by the antenna ANT that includes the coil L1 and the coil L2. More specifically, the AC voltage is generated in the coil L1 by the AC magnetic field generated in the coil L2 due to the AC current flowing through the coil L2 according to the signal output from the second control unit 165. The first control unit 164 is operated by the AC voltage generated in the coil L1. As described above, in the present exemplary embodiment, the power is supplied from the second control unit 165 to the first control unit 164 via the antenna ANT. As a result, it is unnecessary to provide, in the first circuit 160a, a power supply that operates the first control unit 164, so that upsizing of the apparatus and increase of the cost can be prevented.

Further, in the present exemplary embodiment, the first control unit 164 changes, for example, the impedance of the coil L1 to change the signal generated in the coil L1, thereby transmitting data to the second control unit 165. The second control unit 165 detects the change to read the data from the first control unit 164. Thus, the first control unit 164 transmits data to the second control unit 165 that is electromagnetically coupled by the antenna ANT. Therefore, it is unnecessary to provide a transformer between the first circuit 160a and the second circuit 160b, so that upsizing of the apparatus and increase of the cost can be prevented while maintaining insulation between the first circuit 160a and the second circuit 160b.

The configuration in which the first control unit 164 outputs the stop signal in the case where the effective values of the data output from the CPU 151a and the effective values output from the first control unit 164 are not coincident with each other, and the configuration in which the first control unit 164 outputs the stop signal when the state where no request signal is received, continues for the predetermined time T3, may be applied to and combined with the AC driver 160.

In the first exemplary embodiment and the second exemplary embodiment, the second control unit 165 controls the drive circuit 166b and the triac drive circuit 167a. Alternatively, a configuration for controlling the drive circuit 166b and a configuration for controlling the triac drive circuit 167b may be separated.

Further, in the first exemplary embodiment and the second exemplary embodiment, the first control unit 164 changes the impedance of the coil L1 to transmit data to the second control unit 165; however, the configuration is not limited thereto. For example, the first control unit 164 may change a frequency of the signal generated in the coil L1 to transmit data to the second control unit 165.

Furthermore, the function of the CPU 151a in the first exemplary embodiment and the second exemplary embodiment may be included in the second control unit 165.

The voltage V, the current I, etc. in the first exemplary embodiment and the second exemplary embodiment correspond to parameters relating to power supplied to a load.

Further, the triac drive circuit 167a and the triac 167 in the first exemplary embodiment and the second exemplary embodiment are included in an adjusting unit and a triac circuit.

In the first exemplary embodiment and the second exemplary embodiment, the configuration for controlling the timing at which the triac 167 is turned on, is used to adjust the power to be supplied to the heating body 161a; however, the configuration is not limited thereto. For example, a configuration may be used in which amplitudes of the voltage and the current supplied to the heating body 161a are modulated to adjust the power supplied to the heating body 161a.

According to the present disclosure, increase of the power consumption can be suppressed.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2017-236229, filed Dec. 8, 2017, which is hereby incorporated by reference herein in its entirety.

What is claimed is:

1. A power supply apparatus that includes a first circuit connected to a predetermined power supply, and a second circuit insulated from the first circuit, the power supply apparatus comprising:
   a switcher provided in the first circuit and configured to switch between a supplied state where power is supplied from the predetermined power supply to a load, and an interrupted state where the power is not supplied from the predetermined power supply to the load;
   a driver provided in the second circuit and configured to output a switching signal to switch a state of the switcher;
   an adjusting unit provided in the first circuit and configured to adjust the power supplied from the predetermined power supply to the load;
   a first control unit provided in the first circuit and configured to detect a parameter relating to the power supplied to the load;
   a second control unit provided in the second circuit and configured to control the adjusting unit;
   a first communication portion provided in the first circuit and connected to the first control unit; and
   a second communication portion provided in the second circuit, insulated from the first communication unit, and is configured to perform wireless communication with the first communication portion,
   wherein the first control unit is operated by power that is supplied by a signal generated in the first communication portion due to a signal output from the second control unit to the second communication portion,
   wherein the first control unit transmits, to the second communication portion, information relating to a detection result, wherein the second control unit controls the adjusting unit based on the information transmitted to the second communication portion, wherein the first control unit outputs, to the driver, a predetermined signal to cause the driver to output the switching signal for putting the switcher into the interrupted state in a case where abnormality occurs in the second circuit, and wherein the driver outputs the switching signal for putting the switcher into the interrupted state when the predetermined signal is output from the first control unit.

2. The power supply apparatus according to claim 1,
wherein the second control unit outputs, to the driver, a second predetermined signal to cause the driver to output the switching signal, and wherein the driver outputs the switching signal for putting the switcher into the interrupted state when the second predetermined signal is provided from the second control unit.

3. The power supply apparatus according to claim 2,
wherein the driver includes a light emitting device that is provided in the first circuit and configured to emit light according to the second predetermined signal, and a light receiving device that is provided in the second circuit and configured to receive light emitted from the light emitting device, and wherein the driver outputs the switching signal for putting the switcher into the interrupted state when the light receiving device receives the light.

4. The power supply apparatus according to claim 1,
wherein the second control unit outputs a signal, requesting the information, to the first control unit via the second communication portion and the first communication portion, wherein the first control unit transmits the information to the second control unit via the second communication portion and the first communication portion, in response to the signal requesting the information, and wherein the first control unit outputs the predetermined signal to the driver when a state where no signal requesting the information is received continues for a predetermined time.

5. The power supply apparatus according to claim 1,
wherein, when the second control unit acquires the information relating to the detection result from the first control unit through the wireless communication, the second control unit transmits the information, which the second control unit has acquired from the first control unit through the wireless communication, to the first control unit through the wireless communication, and wherein, in a case where the information which the first control unit has received from the second control unit through the wireless communication is not coincident with the information which the first control unit has transmitted to the second control unit through the wireless communication, the first control unit outputs the predetermined signal to the driver.

6. The power supply apparatus according to claim 5,
wherein the first control unit includes a memory configured to store the information which the first control unit has transmitted to the second control unit through the wireless communication, and wherein, in a case where the information which the first control unit has received from the second control unit through the wireless communication is not coincident with the information stored in the memory, the first control unit outputs the predetermined signal to the driver.

7. The power supply apparatus according to claim 1,
wherein the parameter relating to the power is a current supplied to the load, and wherein, in a case where an effective value of the current detected by the first control unit is larger than a predetermined value, the second control unit controls the adjusting unit to make the power supplied to the load smaller.

8. The power supply apparatus according to claim 1,
wherein, in a case where an effective value of power determined based on the detection result of the first control unit is larger than a second predetermined value, the second control unit controls the adjusting unit to make the power supplied to the load smaller.

9. The power supply apparatus according to claim 1,
wherein the first control unit detects a voltage supplied from the predetermined power supply, and wherein the second control unit controls the adjusting unit based on an effective value of the voltage detected by the first control unit.

10. The power supply apparatus according to claim 1,
wherein the switcher is a relay circuit including a winding provided in the second circuit, and wherein the relay circuit is switched from the interrupted state to the supplied state in response to supply of a current to the winding.

11. The power supply apparatus according to claim 1,
wherein the adjusting unit is a triac circuit, and wherein, the second control unit increases a period in which the triac circuit is in an ON state in order to increase the power supplied to the load, and the second control unit reduces the period in which the triac circuit is in the ON state in order to reduce the power supplied to the load.

12. The power supply apparatus according to claim 1,
wherein the first communication portion includes a first antenna including a winding, and a transmission unit configured to transmit the information by controlling impedance of the winding of the first antenna, wherein the second communication portion includes a second antenna including a winding, and wherein the wireless communication between the first communication portion and the second communication portion is performed by the first antenna and the second antenna.

13. The power supply apparatus according to claim 12,
wherein the winding of the first antenna is connected to a variable resistor, and wherein the first communication portion varies a resistance value of the variable resistor to control the impedance of the winding of the first antenna.

14. The power supply apparatus according to claim 1,
wherein the predetermined power supply is a commercial power supply.

15. An image forming apparatus, comprising:
a transfer unit configured to transfer a toner image onto a sheet; and
a fixing unit configured to fix the toner image transferred onto the sheet by the transfer unit, on the sheet by heat of a heater,
wherein the fixing unit includes:
a first circuit connected to a predetermined power supply;
a second circuit insulated from the first circuit;

a switcher provided in the first circuit and configured to switch between a supplied state where power is supplied from the predetermined power supply to the heater, and an interrupted state where the power is not supplied from the predetermined power supply to the heater;

a driver provided in the second circuit and configured to output a switching signal to switch a state of the switcher;

an adjusting unit provided in the first circuit and configured to adjust the power supplied from the predetermined power supply to the heater;

a first control unit provided in the first circuit and configured to detect a parameter relating to the power supplied to the heater;

a second control unit provided in the second circuit and configured to control the adjusting unit;

a first communication portion provided in the first circuit and connected to the first control unit; and a second communication portion provided in the second circuit, insulated from the first communication unit, and is configured to perform wireless communication with the first communication portion, wherein the first control unit is operated by power that is supplied upon receiving a signal generated in the first communication portion due to a signal provided from the second control unit to the second communication portion, wherein the first control unit transmits, to the second communication portion, information about a detection result, wherein the second control unit controls the adjusting unit based on the information transmitted to the second communication portion, wherein the first control unit outputs, to the driver, a predetermined signal for causing the driver to output the switching signal for putting the switcher into the interrupted state in a case where abnormality occurs in the second circuit, and wherein the driver outputs the switching signal for putting the switcher into the interrupted state when the predetermined signal is output from the first control unit.

* * * * *